US011938486B2

(12) United States Patent
Schryver et al.

(10) Patent No.: US 11,938,486 B2
(45) Date of Patent: Mar. 26, 2024

(54) CRYOBAG THAWING METHODS

(71) Applicant: BiolifeSolutions, Inc., Bothell, WA (US)

(72) Inventors: Brian Schryver, Redwood City, CA (US); Ryan Braunstein, San Carlos, CA (US)

(73) Assignee: BIOLIFE SOLUTIONS, INC., Bothell, WA (US)

( * ) Notice: Subject to any disclaimer, the term of this patent is extended or adjusted under 35 U.S.C. 154(b) by 684 days.

(21) Appl. No.: 17/151,483

(22) Filed: Jan. 18, 2021

(65) Prior Publication Data

US 2021/0220832 A1 Jul. 22, 2021

Related U.S. Application Data

(60) Provisional application No. 62/962,733, filed on Jan. 17, 2020.

(51) Int. Cl.
*B01L 7/00* (2006.01)
*B01L 3/00* (2006.01)

(52) U.S. Cl.
CPC ............. *B01L 7/5255* (2013.01); *B01L 3/505* (2013.01); *B01L 2200/147* (2013.01); *B01L 2300/123* (2013.01); *B01L 2300/1827* (2013.01)

(58) Field of Classification Search
CPC .......... B01L 7/5255; B01L 7/00; B01L 3/505; B01L 2200/147; B01L 2300/123; B01L 2300/1827; B01L 2300/1844
See application file for complete search history.

(56) References Cited

U.S. PATENT DOCUMENTS

| | | | |
|---|---|---|---|
| 2018/0360023 A1* | 12/2018 | McPherson | .......... A01N 1/0242 |
| 2019/0041308 A1 | 2/2019 | Schryver et al. | |
| 2019/0075786 A1 | 3/2019 | Milne et al. | |
| 2019/0336660 A1 | 11/2019 | Shavit et al. | |
| 2023/0301295 A1* | 9/2023 | Shani | ................... A01N 1/0252 435/1.3 |

FOREIGN PATENT DOCUMENTS

AU          2013340326 A1 *   3/2015   ............... A01N 1/02

OTHER PUBLICATIONS

International Search Report for PCT/US2021/013777 dated Apr. 1, 2021.

* cited by examiner

*Primary Examiner* — Shawntina T Fuqua
(74) *Attorney, Agent, or Firm* — Brown & Michaels, PC

(57) ABSTRACT

A consistent and repeatable thawing method of frozen samples in a bag-format storage vessel is described herein. Methods and systems may allow for multiple bag-format storage vessel sizes to be used in the same device. A subset of a plurality of sensors may be qualified for the thawing method. The method may further include heating a frozen sample using a first heater bank and a second heater bank. In addition, the method may include measuring a plurality of second temperatures of the bag-format vessel. At or slightly after a second threshold temperature, the method may include heating using the first heater bank and terminating heating using the second heater bank. The method may include terminating the heating of the partially thawed sample using the first heater bank after the partially thawed sample has been heated using the first heater bank for a duration.

25 Claims, 8 Drawing Sheets

CRYOBAG THAWING METHODS

CROSS-REFERENCE TO RELATED APPLICATIONS

The present application claims priority to U.S. Provisional Application No. 62/962,733 filed Jan. 17, 2020, the full disclosure of which is incorporated herein by reference in its entirety for all purposes.

BACKGROUND

Cryogenic preservation of cells in suspension is a well-established and accepted technique for long term archival storage and recovery of live cells. As a general method, cells are suspended in a cryopreservation media typically including salt solutions, buffers, nutrients, growth factors, proteins, and cryopreservatives. The cells are then distributed to archival storage containers of the desired size and volume, and the containers are then reduced in temperature until the container contents are frozen. Typical long-term archival conditions include liquid nitrogen vapor storage where temperatures are typically between −196° C. and −150° C. Vials or bag-format storage vessels can be used to store such sample fluids, as appropriate for the given volume or application of the cryopreserved sample.

The successful recovery of live cells preserved by such methods may be dependent upon minimizing injurious ice crystal growth in the intracellular region during both the freezing and thawing processes. Returning the sample from the cryogenic archival state involves thawing the sample to a fully liquid state. During the thawing process, the rate of temperature change can influence the viability of the cryogenically preserved cells. The solid contents of the sample storage vessels contain large islands of crystallized water that are interposed by channels of glass state aqueous solutes intermixed with small nuclei of ice crystals. During the transition from the cryogenic storage temperature to the conclusion of the phase change to a completely liquid state, there is an opportunity for rearrangement of the water molecules within the sample including a thermodynamically favored extension of the small ice nuclei within the cells. As the growth of the intracellular ice crystals have an associated potential for cell damage, and as the degree of crystal growth is a time-dependent phenomenon, minimizing the time interval of the transition through the phase change is desirable.

A rapid slew rate in the sample vessel temperature is typically achieved by partial submersion of the vessel in a water bath set to a temperature of approximately 37° C. Although a faster rate of thawing can be achieved by increasing the temperature of the bath, submersion of the vessel in the bath will establish temperature gradients within the vessel with the highest temperatures being located at the vessel wall. As a result, transient thermodynamic states will occur wherein the temperature of the liquid-solid mixture will exceed the melting temperature even though frozen material is present in close proximity. The intra-vessel temperature gradient therefore places an upper limit on the bath temperature. In addition, as common cryoprotectants have a known toxic influence on the cells, differential exposure of the cells in the liquid state with respect to time and temperature allows for variation in the viability of the cells upon completion of the thaw process. As the toxic effect of the cryoprotectants is enhanced at elevated temperatures, a lower liquid temperature is desirable. For this reason, some thawing protocols typically include a rapid thaw phase that is terminated when a small amount of solid material still remains in the sample container. Following removal from the water bath, the sample temperature will quickly equilibrate to a temperature that is near to the phase change temperature. Thawing protocols typically seek to minimize the duration at which the thawed sample is held in a state where the cryoprotectant is concentrated, and subsequent steps to dilute the sample or exchange the cryopreservation media for culture media are commonly applied in as short of an interval as possible.

While some thawing methods have been proposed to automate sample thawing, further improvements may be had, particularly with regard to samples stored in bag-format cryopreservation vessels (referred to as "cryobags").

BRIEF SUMMARY

The present disclosure is generally related to systems and methods for thawing a frozen sample in a bag-format storage vessel. In various aspects, the present disclosure relates to the cryogenic preservation of cells, tissues, and fluids, and to systems, devices, and methods for the recovery of cryogenically-preserved cells, tissues, and fluids.

Embodiments of the present invention may allow for a consistent and repeatable thawing of frozen samples in a bag-format storage vessel. The thawing may be just to the point where some solid phase is remaining in a liquid phase. Embodiments may allow for multiple bag-format storage vessel sizes to be used in the same device.

Embodiments of the present invention may include a method of thawing a frozen sample in a bag-format vessel. The method may include measuring a plurality of first temperatures of the bag-format vessel in contact with a first surface and a second surface. Each first temperature of the plurality of first temperatures may be measured by a different sensor of a plurality of sensors. Each sensor of the plurality of sensors may be configured to measure temperature at a different location of the bag-format vessel. The method may include comparing each first temperature of the plurality of first temperatures to a first threshold. The method may also include determining a subset of the plurality of sensors using the comparison, where each sensor of the subset of the plurality of sensors measured a first temperature below the first threshold. The method may further include heating the frozen sample using a first heater bank and concurrently heating the frozen sample using a second heater bank. In addition, the method may include measuring a plurality of second temperatures of the bag-format vessel, using the subset of the plurality of sensors. A second temperature of the plurality of second temperatures exceeding a second threshold may indicate that a partially thawed sample is in the bag-format vessel. At or slightly after that point, the method may include heating the partially thawed sample using the first heater bank and terminating heating of the partially thawed sample using the second heater bank. The method may include terminating the heating of the partially thawed sample using the first heater bank after the partially thawed sample has been heated using the first heater bank for a duration.

Embodiments may also include a thawing system. The thawing system may include a thawing device. The thawing device may include a first surface, a second surface, a plurality of sensors, a first heater bank, and a second heater bank. The thawing system may also include a computer system. The computer system may include instructions that when executed control the thawing device to perform a thawing method.

A better understanding of the nature and advantages of embodiments of the present invention may be gained with reference to the following detailed description and the accompanying drawings.

DETAILED DESCRIPTION

Figure 1A:
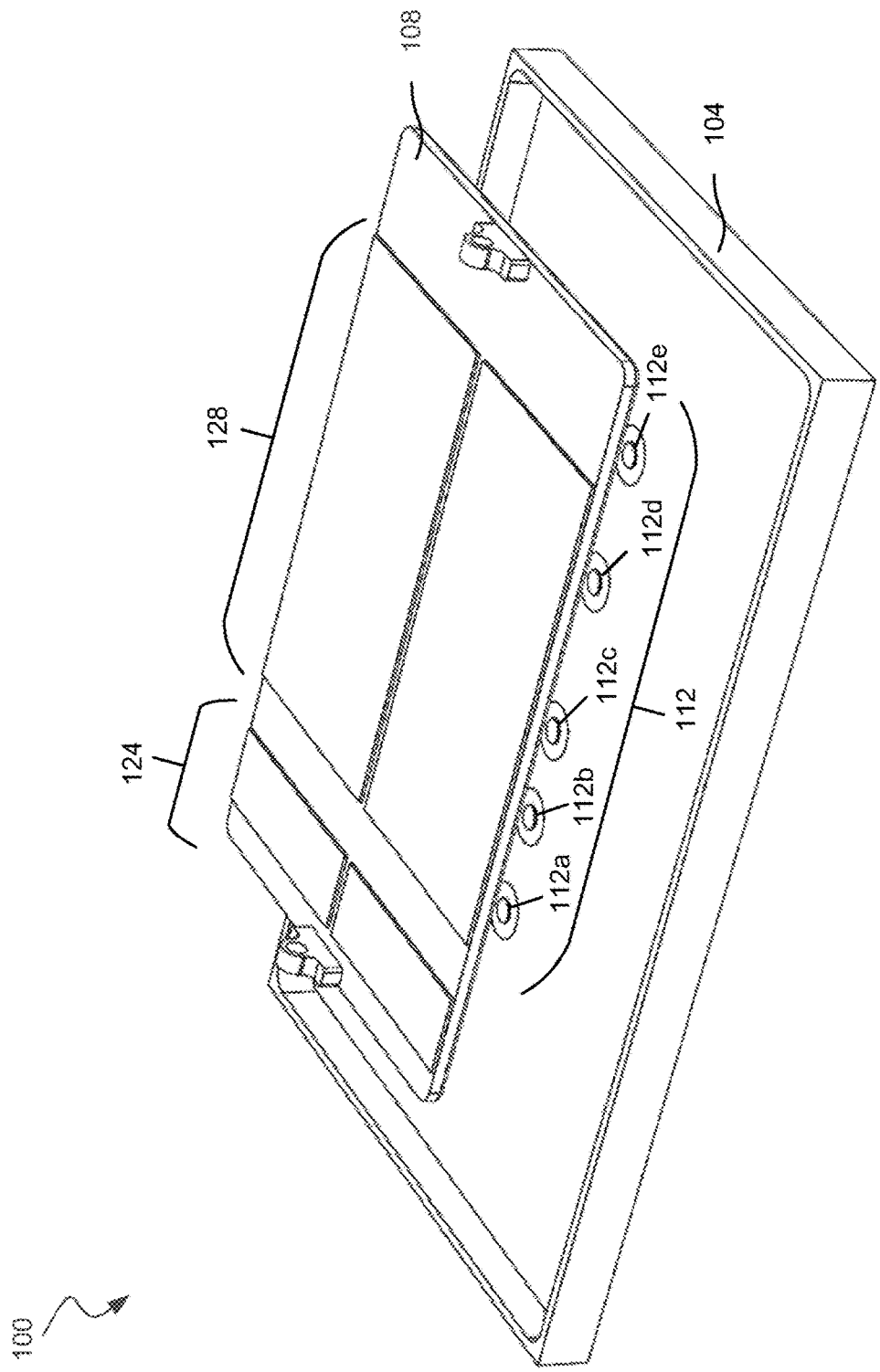
FIGS. 1A, and 1B show views of a sample thawing apparatus, focusing on the plates, heaters, and sensor according to embodiments of the present invention.

For thawing cells stored in a cryobag, conventional practice is to warm the cells quickly in a warm water bath (e.g., 37° C.) to just about the point at which the last bit of ice is about to melt, and then to dilute the cells slowly into growth media. If the sample is allowed to get too warm, the cells may start to metabolize, and be poisoned by the dimethyl sulfoxide (DMSO) that is often used in the freezing process. Generally, the thawing of cryogenically preserved cells and tissue is performed by lab technicians, and the applied protocol can not only vary between each lab technician, but may also be technique dependent. The completion of sample thaw is generally subjectively judged by each individual technician and may result in variation in the thaw rate or in samples which have been allowed to become too warm. Although a repeatable thawing profile is theoretically possible to achieve using a bath and manual control of the cryobag insertion, expected variance in both technique and degree of protocol compliance, particularly combined with the requirement to frequently remove the cryobag from bath to monitor the thaw status, makes deviation from the standard profile a near certainty. The removal of the cryobag from the bath interrupts the thermal energy transfer from the bath water to the cryobag and visual assessment of the thaw status is often difficult and may be complicated by the presence of labels and printed writing surfaces that are provided as integrated features of the cryobag product. Further, water baths are also a source of contamination and inadvertent submersion of the cryobag sealing junction can result in the introduction of bath liquid into the cryobag contents during opening or removal of the cryobag sealing junction.

Embodiments of the present invention may allow for a consistent and repeatable thawing of frozen samples in a cryobag. Multiple cryobag sizes may be thawed in the same device. Some cryobags may have sizes substantially smaller than the heating plates used for thawing. Embodiments of the present invention avoid over-thawing and damaging the sample by ramping down or shutting off heaters positioned away from cryobags substantially smaller than the heating plates. Latent heat in the heating plates may be sufficient to thaw a portion of the cryobag. Other heaters may continue to thaw another portion of the cryobag positioned in contact or closer contact with the heaters.

I. Overview

A thawing system may be designed to thaw the frozen contents of standard cryobags, which are a type of bag-format vessels. As the cryobags are commercially available in a nominal volume range of 25 ml to 1000 ml and greater but are intended to contain a volume that is a fraction of the nominal size in most instances such that when the bag is frozen in a flat orientation, the maximum cross-sectional thickness of the bag is approximately 0.4 inches. The cryobags are typically rectangular in outline, and are provided with a system of tubing through which the bags are filled. Following filling and before freezing, the fill tubing is heat-sealed and trimmed such that the tubing protrudes from the bag end no more than approximately one inch. In addition to the tubing, the same end region of the cryobag will typically feature two or more port features that are sealed until breached by a connector tubing linkage through which the contents of the bag may be retrieved. The region of the cryobag where the ports are located is referred to the neck or proximal end of the cryobag. The thawing system may receive a cryobag and contents in a frozen state with an initial temperature of approximately −70° C. to −196° C. and rapidly increase the temperature of the bag and contents through the phase change temperature until the bag contents are predominately in the liquid state. As a visual indication that the thawed contents of vessel have not been subjected to an unacceptably high temperature, the cryopreservation community has adopted as a convention an expectation that some solid phase remnant be present upon the completion of the thawing process.

The thawing system may accept a range of frozen cryobag sizes, where for each cryobag size, a range of fill volumes may be applied. The instrument may thaw the contents of the bag at a rate that approximates the thawing rate experienced when the cryobag is submerged in a water bath that is at a temperature of approximately 37° C. The thawing system may agitate the bag contents during the thawing process to maintain a uniform temperature distribution and may automatically terminate the thawing process while there is some solid phase remaining in the bag.

Figure 1B:
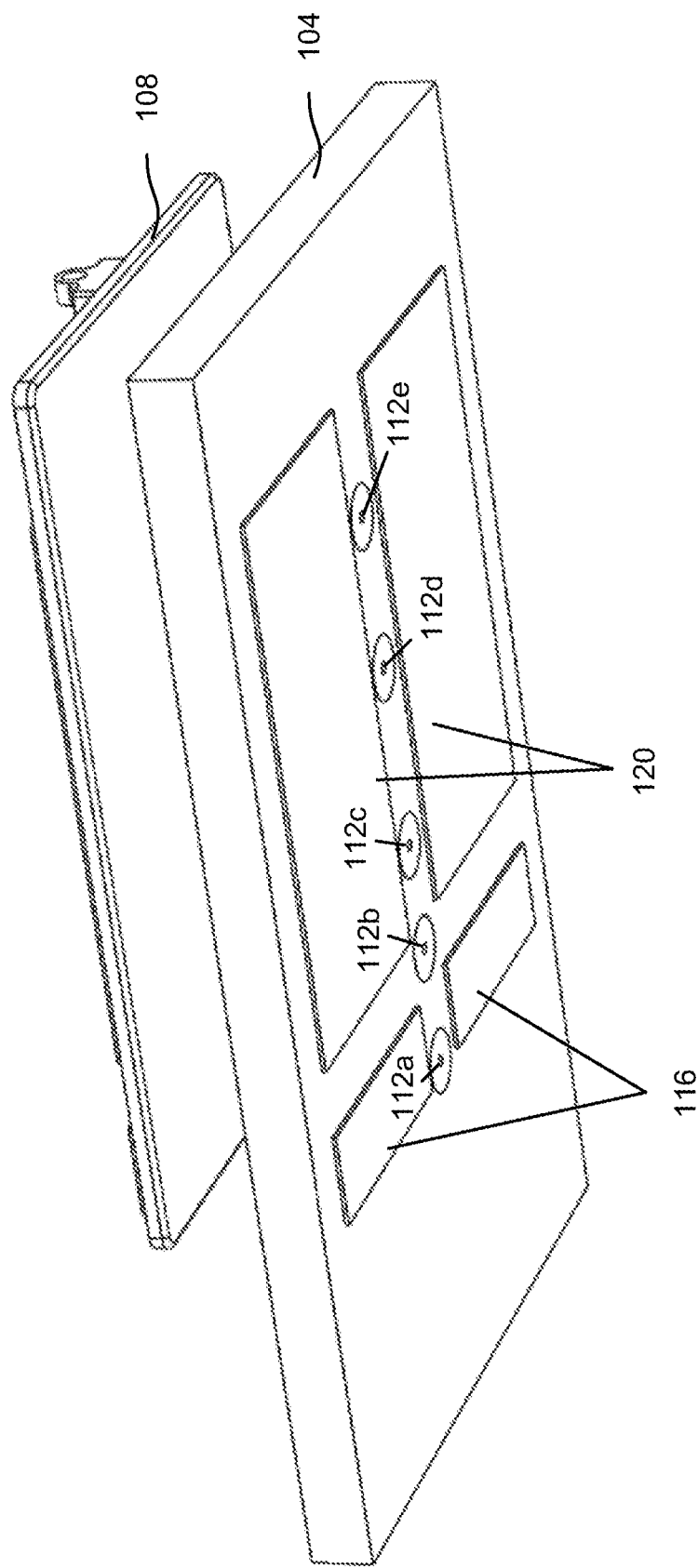
Figure 1C:
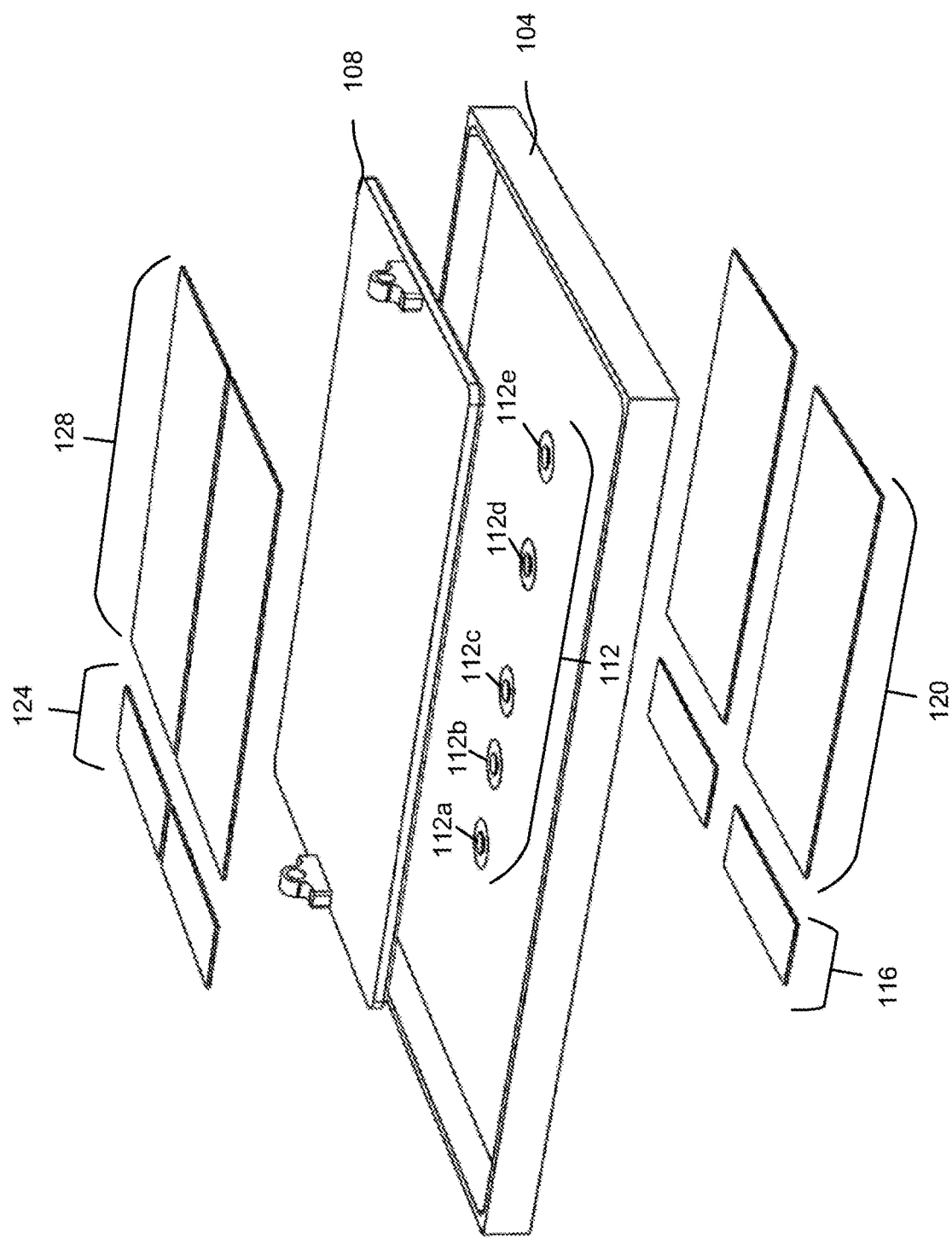
FIG. 1C shows an exploded view of a sample thawing apparatus, focusing on the plates, heaters, and sensor according to embodiments of the present invention.

FIGS. 1A, 1B, and 1C show the plates, heaters, and sensors of a thawing unit 100.

Thawing unit 100 may include two aluminum plates (e.g., lower plate 104 and upper plate 108) that contact the upper and lower major surfaces of the cryobag with a light clamping pressure to assure optimal contact of the plate with the bag. Lower plate 104 may be configured as an extensible drawer and as such comprises an area that will accommodate the largest bag size (e.g., 1000 ml). A cryobag may be positioned between lower plate 104 and upper plate 108, with the ports of the cryobag located on the left side of the plates relative to the figures. Upper plate 108 may be hinged on an axis that is parallel to the long dimension of the cryobag such that the plate may be rocked to mix the contents of the bag during the thawing process. In addition, the upper plate 108 may be restricted to the area of the cryobag where the port features are not present so that the ports do not restrict the clamping pressure of the upper plate on the portion of the cryobag where the contents are located.

As such, the ports for all bag sizes may be intentionally located to the same region of the lower plate such that as the bags increase in size and capacity, the bags extend to the region of the plate distal to the port region. "Upper," "lower," "bottom," and "top" are used for convenience to describe the orientation of the bag or the plates. However, the cryobag and the plates may be oriented vertically or at any angle between horizontal and vertical.

Lower plate 104 may include a set 112 of thermal sensors (sensors 112a-e) embedded in an insulating media such that when a cryobag is resting on lower plate 104, sensors 112a-e may thermally couple with the bag and not lower plate 104. Sensors 112a-e may report the temperature of the bag surface, the bag surface being offset by only a few degrees from the cryobag contents on the interior wall opposite to the sensor. As the plate sensors report a close proxy temperature for the bag contents and as the mixing system promotes a uniform temperature in the cryobag contents, a termination of the thawing process may be triggered upon achieving a pre-set temperature threshold that has been previously determined to be associated with a phase change transition state wherein a low percentage of solid phase remains in the bag solution. Set 112 of thermal sensors may be distributed along a line in lower plate 104. Set 112 of thermal sensors may be distributed so that a cryobag of a given size typically is in contact with two or more sensors. As a result of the different cryobag geometries, sensors 112a-e may not be distributed evenly across the plate. The end of thaw temperature threshold may be configured such that all participating temperature sensors must pass the threshold for the thaw to be terminated. As a safety mechanism, the temperature reading from sensors that have passed the threshold may be used to monitor a secondary temperature threshold for over-temperature, and be used to trigger a termination of the thawing process to prevent excursions into temperature ranges that are potentially deleterious to the viability of biological suspensions within the cryobag solution.

The set of thaw control variables may include a temperature value that defines a threshold below which a given bag temperature sensor must reach in order to qualify to participate in the thaw control process. As an example, lower plate 104 may include 5 separate temperature sensors (e.g., sensors 112a, 112b, 112c, 112d, and 112e) distributed strategically along the midline of lower plate 104 such that contact is made with the cryobag along the midline as well. As the length of the bag changes according to the nominal capacity of the cryobag, for lower capacity bags, some of the sensors 112a-e will not be engaged with the bag. The identity of the sensors that have the ability by virtue of position to couple with the cryobag of a given capacity may be identified in a variable table or identified dynamically by lack of temperature depression upon the commencement of the thawing cycle. However, if the undersurface of the cryobag is not planar or includes incidental gas pockets or any depressions, a sensor that would otherwise report a cryobag temperature may supply artifactual information. For this reason, each sensor may be required to report a temperature depression of sufficient value in order to qualify in the thawing process control algorithm. If no sensors qualify for the temperature depression threshold after a certain time limit, the user may be informed of this error condition through the display screen. This time limit value of seconds post the commencement of the thawing process may be stored in the control variable set. The qualification failure event may be coupled to an algorithmic sequence that will terminate the thawing process and eject the cryobag from the instrument.

The cryobag temperature sensor data stream may be stored and monitored by a graphic display or transferred to portable media along with metadata for the specific thaw file for archival storage for review.

A. Thawing Stages

The cryobag thawing process may be divided into two stages. The first stage may be the temperature transition phase in which the thermal energy influx into the bag and its contents serves primarily to transition the temperature from the cryogenic starting temperature to the beginning of the phase change of the cryobag contents. The beginning of the phase change may be characterized by the initial formation of a liquid phase within the cryobag. As the cryobag contents typically include a complex aqueous formulation, the phase change is not an abrupt transition but is rather spread over a temperature range. As the phase change commences during the thawing process, the liquid phase may distribute throughout the inner cryobag surface thereby increasing the thermal contact of the bag with the heating plates as the bag conforms to the plate surface. The interval from the beginning of the phase change to the termination of the thaw process can be defined as the second stage.

Upper plate 108 and lower plate 104 each may include two banks of flat resistance mat heaters. On lower plate 104, a first bank 116 of the heaters may be located at the proximal or neck region of the bag, while a second bank 120 of heaters with larger wattage may be located distal to first bank 116 with respect to the neck and port region of the cryobag. On upper plate 108, a third bank 124 of heaters may be located at the proximal or neck region of the bag, while a fourth bank 128 of heaters with larger wattage may be located distal to third bank 124. Each bank is shown as including two identical heaters, although the number of heaters may be less or more in embodiments. Using only one heater bank per plate may result in overthawing of the distal portion of the bag. Using too many heater banks per plate may result in unnecessary process complexity and increased costs. However, in some embodiments, additional heater banks may be used (e.g., a total of 3, 4, 5, 6, 7, 8, or more). Further division of the distal heater banks may be used for segmented bags or bags with septum boundaries.

As the mat heaters may be uniform in energy output per unit area, the larger wattage heaters cover a wider area than the smaller wattage neck heaters. For the range of cryobag sizes, as the size of the cryobag decreases, a greater area of both the upper and lower plate will be without a thermal sink and therefore will begin to increase in temperature at a greater rate than the area of the plate in contact with the cryobag. The net result of the temperature imbalance in the plates may be an increased heat influx into the distal end of the cryobag and therefore may impose a transition through phase change at a greater rate than the neck region. Should the thawing algorithm terminate the thaw based on a high sensor reading from the distal region, the neck region may still be in the solid phase, and therefore the thawing process upon termination will be uneven.

B. Stage Transition Control

To establish a balanced thawing endpoint for different cryobag sizes, the system may have to determine the cryobag size. The cryobag size may be determined dynamically through sensors or from a user input. The determination of size may identify a table entry for a set of variables that will control the thawing process for the specific bag size. Included in the variable table may be a timepoint value that may be used to trigger a transition from the first thawing stage to the second thawing stage. The stage transition may also be controlled by a temperature set point that may be triggered by any combination of qualified cryobag temperature sensor data streams. The neck and distal heater banks on the upper and lower plates may be individually controlled by local temperature sensor feedback loops through PID algorithms to achieve and hold a set point temperature. An initial or first stage temperature setting may be applied to all heater banks to achieve a rapid cryobag temperature transition to the beginning of phase change.

After the beginning of phase change, a secondary group of temperature settings may be applied to the neck heater banks (e.g., first bank 116 and third bank 124) and distal heater banks (e.g., second bank 120 and fourth bank 128) in order to balance the cryobag content phase change process across a length of the cryobag. The heater setting transition for mid-size and small size bags may be stored in the variable table. The variable table may be based on empirical data and may be used to populate a control variable. The control variable may be adjusted to optimize the thawing process outcome. By way of example, a 250 ml nominal size cryobag may contain from 30 ml to 70 ml of biologic material content, and the cryobag may occupy approximately one-half of the plate area. During the first stage of the thaw process, the proximal or neck portion as well as the distal portion of the plate is temperature controlled to the first stage set point. However, under the thermal sink load, both plates may experience a dip in temperature. As a result of the dip in temperature, the heater banks may energize to respond to the temperature drop to attempt to restore the plates to the temperature set point.

During the second stage of the thaw, when the temperature of the cryobag approaches the pre-determined temperature endpoint, less demand may be placed on the heating system to restore the plate temperature to the set point. However, the distal portion of the plates that are not in contact with the cryobag may contain substantial residual thermal energy that may migrate toward the proximal end of the plate, toward the cryobag heatsink. If left uncompensated, additional distal region plate heat reservoir may cause the distal region of the cryobag to thaw in advance of the proximal region of the cryobag. Therefore, second stage heater settings may be engaged at this point to transition the distal heaters to a lower temperature setting such that the thermal energy distribution across the plate is uniform. In some situations, the proximal heater bank may transition to a higher temperature setting such that the PID control loop applies a greater amount of energy influx. The temperature set points for all bag sizes may, for a given bag solution, be optimized through prior testing. In addition to the stage plate temperature settings, an idle plate temperature setting may be selected as a holding temperature prior to and between thawing procedures. The transition from the first stage to the second stage plate temperature settings may be triggered by temperature data provided by the cryobag temperature sensors, by a time post thaw initiation setting, or a combination of both controls.

The thaw stage and idle plate temperature settings, stage transition signal settings, sensor thresholds for qualification, thaw completion temperature, and high temperature limits may be stored as a profile for a specific thawing application. The profile may also include other control values for the operation of the instrument such as the plate clamping pressure target value, and an absolute thaw duration value to provide a safety backstop to prevent an unanticipated fault condition from producing an over-thawing or over-temperature condition. The profiles may be stored in a database to be recalled at will and loaded into the thawing control variables to execute the desired thawing conditions. The thaw profiles may be transferred to portable storage media or cloud storage, and in addition, external thawing profiles may be transferred from portable storage media or cloud storage into the instrument profile storage data base.

II. Example Method

Figure 2:
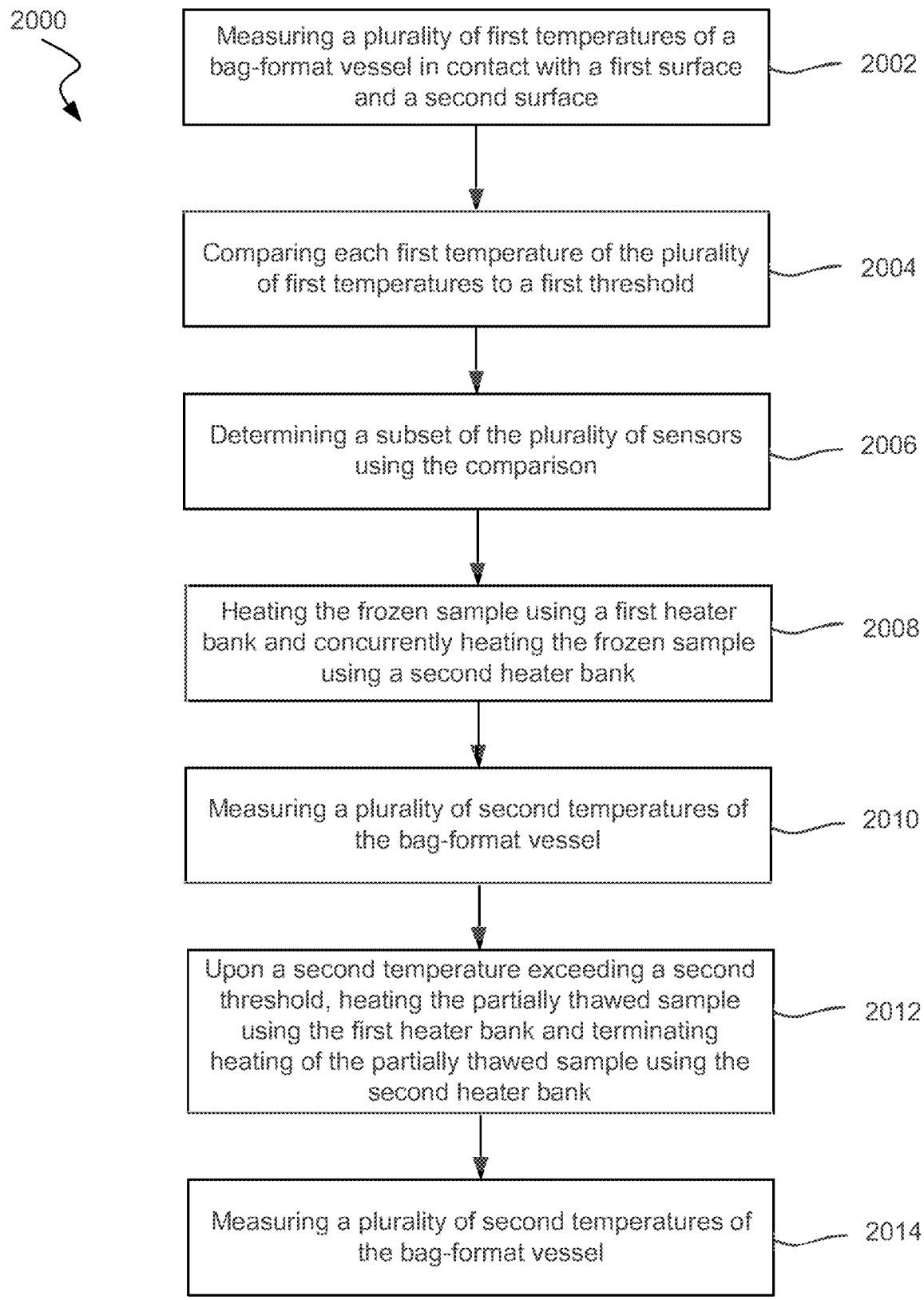
FIG. 2 shows a method of thawing a frozen sample in a bag-format vessel according to embodiments of the present invention.

FIG. 2 shows an example method 2000 of thawing a frozen sample in a bag-format vessel. The bag-format vessel may be any cryobag described herein. The cryobag may have a nominal size of 25, 50, 250, 500, 750, or 1,000 ml. Method 2000 may include using any system described herein. Method 2000 may further include details of the thawing process described above.

The bag-format vessel may include a port. The port of the bag-format vessel may be disposed proximate to a first end of the first surface and a first end of the second surface. The bag-format vessel may have a surface area smaller than a surface area of the first surface and may have a surface area smaller than a surface area of the second surface. The surface area of the first surface may equal the surface area of the second surface. The surface area of the bag-format vessel may be from 10% to 20%, 20% to 30%, 30% to 40%, 40% to 50%, 50% to 60%, 60% to 70%, 70% to 80%, 80% to 90%, or 90% to 95% of the surface area of the first surface or the surface area of the second surface. The length of the bag-format vessel, excluding the ports, may vary from 1 to 2 inches, 2 to 3 inches, 3 to 6 inches, 6 to 8 inches, 8 to 12 inches, or more than 12 inches. The surfaces may be longer than the length of the longest bag-format vessel for thawing but may still accommodate a much smaller bag-format vessel without overthawing its contents.

The first surface and the second surface may be oriented horizontally such that one surface is a bottom surface and the other surface is the top surface. The first surface and the second surface may be oriented vertically or at an angle between horizontal and vertical. One plate may be larger than the other plate. In embodiments, the surface area of the first surface may be from 0% to 10%, from 10% to 20%, from 20% to 30%, from 30% to 40%, from 40% to 50%, or from 50% to 100% larger than the surface area of the second surface. The surfaces may be any surfaces or plates described herein. Any thermally conductive surface may be used, including pliable materials, which may be or may contain gels, liquids, wovens, non-wovens, or screens.

The bag-format vessel may overlap the first surface at a first portion of the first surface and may not overlap the first surface at a second portion of the first surface. The bag-format vessel may overlap the second surface at a first portion of the second surface and may not overlap the second surface at a second portion of the second surface. The first heater bank may be disposed closer to the first portion of the first surface and the first portion of the second surface than to the second portion of the first surface and the second portion of the second surface. The second heater bank may be disposed closer to the second portion of the first surface and the second portion of the second surface than to the first portion of the first surface and the first portion of the first surface.

In embodiments, the first heater bank may be disposed nearer to the first end of the first surface and the first end of the second surface than the second heater bank is disposed to the first end of the first surface and the first end of the second plate. In embodiments, the first heater bank and the second heater bank may both be in the first surface and configured to provide a temperature reading of the bag-format vessel in contact rather than the first surface. In these and other embodiments, the second surface may include a third heater bank and a fourth heater bank. The third heater bank may be aligned with the first heater bank, and the fourth heater bank may be aligned with the second heater bank. The first heater bank may be identical to the third heater bank. The second heater bank may be identical to the fourth heater bank. Each heater bank may include 1, 2, 3, 4, or more heaters.

In embodiments, a line perpendicular to the major surface of the first surface (e.g., plate) extends through the second heater bank and does not extend through the bag-format vessel. The first surface may be parallel to the second surface. In some embodiments, a line perpendicular to the major surface of the first surface (e.g., plate) extends through the second heater bank and through the bag-format vessel.

Method 2000 may include receiving a user input specifying the size of the bag-format vessel. In some embodiments, the only input received from the user is the size of the bag-format vessel. Method 2000 may include receiving a user input specifying the type of media in the bag-format vessel. In some embodiments, method 2000 may include loading the bag-format vessel into a drawer of a device. Method 2000 may include contacting a bag-format vessel with the first surface of a sample thawing device. In addition, method 2000 may include contacting the bag-format vessel with the second surface. Method 2000 may further include clamping the bag-format vessel between the first surface and the second surface.

At block 2002, method 2000 may include measuring a plurality of first temperatures of the bag-format vessel in contact with the first surface and the second surface. Each first temperature of the plurality of first temperatures may be measured by a different sensor of a plurality of sensors. Each sensor of the plurality of sensors may be configured to measure temperature at a different location of the bag-format vessel. The plurality of sensors may include sensors, 2 to 5 sensors, 5 to 8 sensors, 8 to 10 sensors, or more than 10 sensors. The plurality of sensors may not be distributed evenly across the first surface and the second surface. The bag-format vessel may be in contact with at least 2, 3, 4, or more sensors. One surface may include the sensors while the other surface may not have any sensors. In some embodiments, the sensors may be in both surfaces.

At block 2004, method 2000 may include comparing each first temperature of the plurality of first temperatures to a first threshold. The first threshold may be lower than a temperature of the bag-format vessel measured when the bag-format vessel initially contacts the first surface and the second surface. The first threshold may depend on the size of the bag-format vessel and/or the media. For example, the first threshold may be −10° C., from −30° C. to −20° C., from −20° C. to −10° C., or from −10° C. to 0° C. In some embodiments, the first threshold may be a temperature difference, and the measured first temperatures may also be a temperature difference. As an example, the first threshold may be a temperature change of −15° C. The first threshold may be specific to a certain duration. For example, the duration may be at, after, or before 30 to 45 seconds, 45 to 60 seconds, or 1 to 2 minutes after the cryobag is clamped to both surfaces.

At block 2006, method 2000 may include determining a subset of the plurality of sensors using the comparison. The subset of the plurality of sensors may be considered qualified for the thawing process. Each sensor of the subset of the plurality of sensors may have measured a first temperature below the first threshold. The subset of the plurality of sensors may include fewer sensors than the plurality of sensors. In some embodiments, the subset of the plurality of sensors may be the plurality of sensors.

The subset may be determined using the size of the bag-format vessel. The size of the bag-format vessel may be received through a user input or determined by sensors. Sensors determined to be outside the area of the bag-format vessel may be excluded from the subset of the plurality of sensors.

At block 2008, method 2000 may include heating the frozen sample using a first heater bank and concurrently heating the frozen sample using a second heater bank. Heating of the frozen sample may occur before, concurrently with, or after measuring the plurality of first temperatures. Heating the frozen sample using the first heater bank may include targeting a surface temperature set point in the range of 37° C. to 45° C., 37° C. to 40° C., 40° C. to 42° C., 42° C. to 45° C., 45° C. to 50° C., or over 50° C. for the first heater bank and for the second heater bank. This temperature may be the temperature of the surface, measured separate from the plurality of sensors measuring the temperature of the bag-format vessel. The first and second heater banks may have the same temperature set point. The heating may be controlled by a PID loop or any suitable control loop. Heating may also include a third heater bank and a fourth heater bank. Method 2000 may include agitating the surfaces and the bag-format vessel during heating.

At block 2010, method 2000 may include measuring a plurality of second temperatures of the bag-format vessel, using the subset of the plurality of sensors. The plurality of second temperatures may be associated with a time or duration of thawing. A temperature profile may be determined from the measured temperature and the time.

At block 2012, method 2000 may include heating the partially thawed sample using the first heater bank while terminating heating of the partially thawed sample using the second heater bank upon a second temperature of the plurality of second temperatures exceeding a second threshold. The second threshold may be in a range from 0° C. to 8° C., including 0° C. to 4° C. In some embodiments, the second threshold is a temperature difference, and the measured second temperature may be a temperature difference. The temperature difference may be the difference from the first threshold. In some embodiments, only one second temperature of the plurality of second temperatures is needed to exceed the threshold. The one second temperature may be the first second temperature in time or the last second temperature in time to exceed the threshold. In some embodiments, two second temperatures, a majority of second temperatures, or all second temperatures are needed to exceed the threshold. In some embodiments, the second threshold may be an array of temperatures. For example, the second threshold may be include a value for the highest second temperature and a value for the lowest second temperature. In some embodiments, a mean average or a median of the plurality of second temperatures is needed to exceed the threshold. Furthermore, the second threshold may be an array of temperatures. For example, the second threshold may include a value for the highest second temperature and a value for the lowest second temperature. The second threshold may be considered exceeded if any, all, or some of the values of the array are exceeded. The second threshold may be determined empirically and may be determined using the bag-format vessel size and/or the media.

Terminating heating of the partially thawed sample using the second heater bank may include lowering the temperature set point of the second heater bank. Lowering the temperature set point below the temperature of the heater bank may effectively terminate heating by the heater bank. However, if the surface temperature falls below the temperature set point, the second heater bank may re-energize.

At block 2014, method 2000 may include terminating the heating of the partially thawed sample using the first heater bank after the partially thawed sample has been heated using the first heater bank for a duration. In some embodiments, when the heating of the partially thawed sample using the first heater bank is terminated, a majority of the partially thawed sample is an aqueous solution and a solid phase remains in the partially thawed sample. For example, 70% to 80%, 80% to 90%, 90% to 95%, 96%, 97%, 98%, 99%, 99.5%, 99.9%, or 99.99% of the contents on a mass or volume basis may be in liquid phase with the remainder in solid phase. The remaining solid phase may be granular. The solid phase may be a fine grain distributed substantially uniformly through the bag-format vessel. The partially thawed sample may resemble a fine slush.

In some embodiments, terminating the heating of the partially thawed sample may occur at a predetermined time. The predetermined time may be calculated using an empirically-derived phase change duration. The predetermined time may be 30 seconds to 1 minute, 1 to 3 minutes, 3 to 5 minutes, 5 to 7 minutes, 7 to 10 minutes, 10 to 15 minutes, or more than 15 minutes after the time the first threshold is reached. In some embodiments, the predetermined time may be a safety backstop to prevent overheating in the case of faults or anomalies.

In some embodiments, method 2000 may further include measuring a plurality of third temperatures of the bag-format vessel using the subset of the plurality of sensors. Terminating the heating of the partially thawed sample using the first heater bank may be upon a third temperature of the plurality of third temperatures exceeding a third threshold. The third threshold may be in a range from 4° C. to 25° C. The third threshold may be determined empirically and may differ based on the bag-format vessel size and/or the media. As with the second threshold, the third threshold may be a temperature difference. The third temperature may also be a temperature difference. In addition, as with the second threshold, the third threshold may be based on not solely the third temperature, but may include multiple third temperatures or a statistical value of the plurality of third temperatures. Furthermore, similar to the second threshold, the third threshold may be an array of temperatures. For example, the third threshold may be include a value for the highest third temperature and a value for the lowest third temperature. The third threshold may be considered exceed if any, all, or some of the values of the array are exceeded. For example, the third threshold may be considered exceeded if either the minimum third temperature is above 4° C. or if the maximum third temperature is above 12° C.

In some embodiments, the plurality of third temperatures may be compared to a reference temperature profile. The heating of the partially thawed sample using the first heater bank may be upon a third temperature of the plurality of third temperatures significantly deviating from the reference temperature profile. Deviation from a reference temperature profile may also indicate a leak, overfill, underfill, or an anomaly with the bag-format vessel or the apparatus. The heating may be upon not solely the third temperature, but may include multiple third temperatures or a statistical value of the plurality of third temperatures, similar to as described for other thresholds.

Method 2000 may include removing the bag-format vessel from the device after terminating heating of the partially thawed sample using the first heater bank. In some embodiments, a drawer including the first surface may be automatically opened after terminating heating. The solid phase in the bag-format vessel may become liquid phase in 10 to 20 seconds, 20 to 30 seconds, or 30 to 60 seconds after being removed from the first surface.

In some embodiments, method 2000 may include thawing a second frozen sample in a second bag-format vessel in contact with the first surface and the second surface. The second bag-format vessel may have a different size than the first bag-format vessel. The thawing process for the second bag-format vessel may include any method described for thawing a bag-format vessel.

III. Example System

Example systems that can be used with the methods described herein may include BioLife Solutions ThawSTAR® CB and systems described in U.S. application Ser. No. 16/054,454, filed Aug. 3, 2018, the entire contents of which are incorporated herein by reference for all purposes. The example systems may be combined with and may include aspects of the apparatus illustrated in FIGS. 1A, 1B, and 1C.

Figure 3:
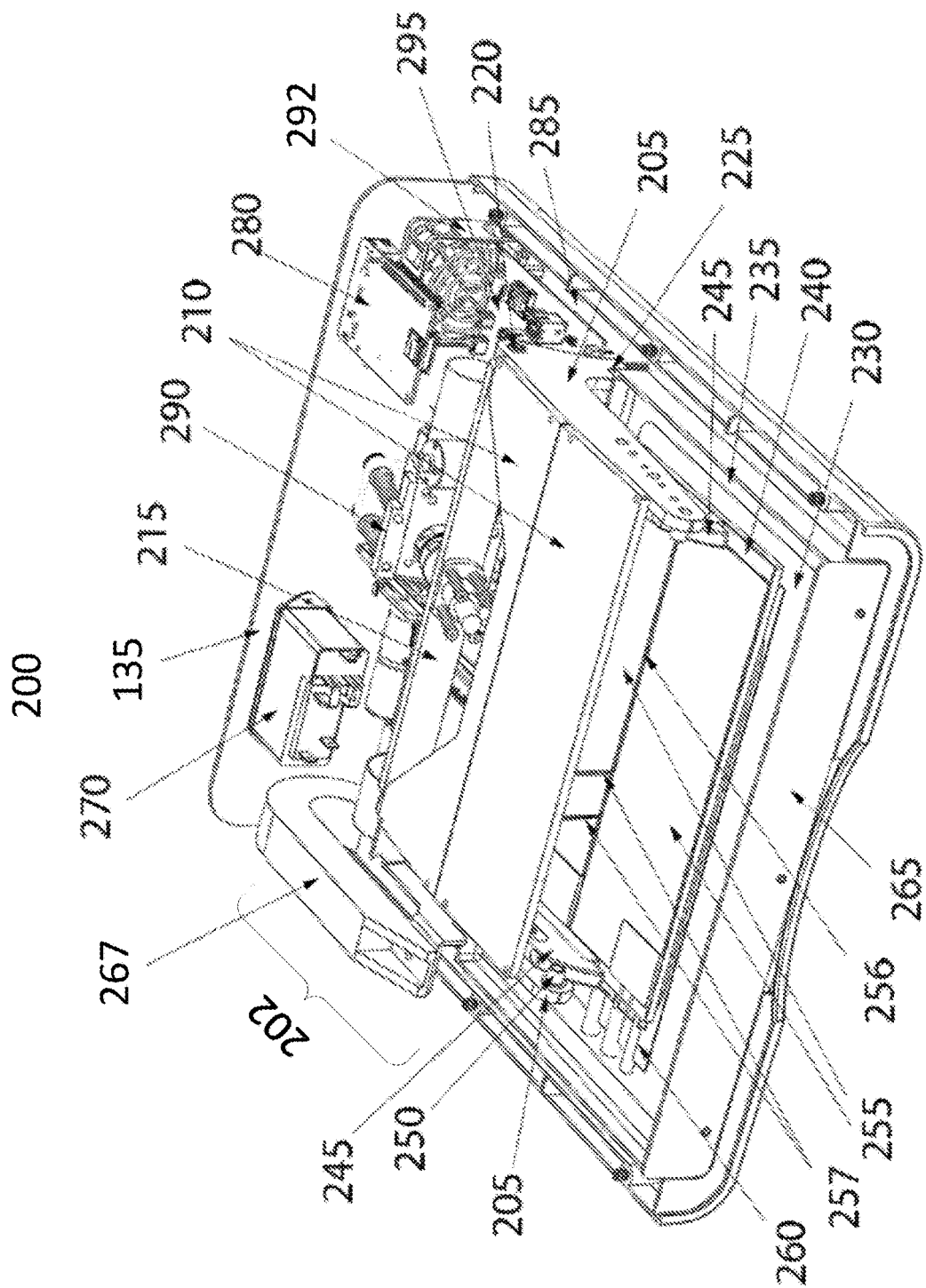
FIG. 3 shows a view of a sample thawing apparatus, where the top of the shell exterior has been removed, according to embodiments of the present invention.

FIG. 3 illustrates internal components of the thawing unit 100, specifically showing a portion of a thawing unit 200 with the upper shell, touch screen cowl, touchscreen interface, and front panel removed. Back panel 135 is shown. Upper heater plate 240 is shown, which can be formed of a material with a generally high thermal conductivity such as, but not limited to, aluminum, aluminum alloys, copper, copper alloys, stainless steel, carbon fiber, graphene materials, and the like. In such aspects, upper heater plate 240 can have a thermal conductivity of from twelve to four hundred Watts per meter-Kelvin ($\kappa$=12-400 W/(m·K)), or at increments or gradients of conductivity within that range. Bonded to the upper surface of the upper heater plate 240 are two or more heaters 255. In some aspects, heaters 255 can be resistance heaters, such as flexible silicone mat heaters. In other aspects, heaters 255 can cover a majority of the surface area of the upper surface of upper heater plate 240. In some embodiments, two heaters 255 are separated by a gap 256 that allows for the passage or placement of one or more thermistors 257 therebetween. The one or more thermistors 257 can be embedded in upper heater plate 240 to monitor the temperature of the upper heater plate 240, and can provide thermal measurement information to a control unit such that the temperature may be controlled by a feedback circuit of the control unit, which regulates the energy applied to the two heaters 255. In some embodiments the heaters 255 on or in the upper heater plate 240 can operate on independent control circuits so that the thermal input to the heater plate can be actively regulated (manually by operator input or automatically by algorithm) to balance the temperature of localized regions of the upper heater plate 240 in response to uneven thermal sinks that may be in contact with the upper heater plate 240. In some embodiments the number of individual heaters 255 on the upper plate may be greater than two in order to apply greater regional control of the temperature of the upper heater plate 240, providing for more precise control and dynamic balancing of heat input to the plate, to such that the thawing unit can accept and evenly thaw bag-format vessels across a large range of sizes or volumes.

In some aspects, heaters 255 can be individually controlled as subsets based on the location of the heaters 255 on the upper surface of the upper heater plate 240. For example, the heaters 255 positioned toward the front of the upper heater plate 240 can be regulated at a different temperature than heaters positioned toward the rear of the upper heater plate 240. Alternatively or in combination, the heaters 255 positioned toward the left side of the upper heater plate 240 can be regulated at a different temperature than heaters positioned toward the right side of the upper heater plate 240. In further aspects, the heaters 255 can be thermally insulated from each other on the surface of the upper heater plate 240, and/or from the rest of the thawing device.

Upper heater plate 240 is attached to the cantilever assembly 202 by two concentric ring surface bearings that interface with three flanged dry bearings 250 rotating on shafts embedded into each of the two cantilever arms 205. The cantilever assembly 202 can be considered as a cantilevered clamp mechanism formed by two cantilever arms 205, cross-plates 210, and a push bar 215. Circular bearing races 245 restrict the motion of the upper heater plate 240 to a rotation around an axis that is coincident with the intersection of a horizontal plane through the middle of the cryobag and a front vertical plane through the midline of the cryobag. The two cantilever arms 205 are joined by two cross-plates 210 that stiffen the cantilever assembly and prevent distortion of the assembly under uneven clamping loads. The cantilever arms 205 rotate on two pivots 225 that join with two bearing blocks (seen in FIG. 4 below) that are also attached to the base plate 285. The cantilever assembly 202 as a whole is articulated by the push bar 215 that attaches to both cantilever arms 205 through two pivot bearings 220. The push bar 215 is articulated by forces produced by a screw-jack mechanism 290.

A model of a standard cryogenic storage bag is shown as vessel 260 clamped between the upper heater plate 240 and the lower heater plate 230. The lower heater plate 230 rests in a frame receiver 235, where the frame receiver 235 is a part of and is movable along with the extensible drawer 265. The lower heater plate 230 can be formed of the same or different materials, with corresponding thermal conductivity, as described with regard to upper heater plate 240. Upon release of the clamping pressure produced by the screw-jack mechanism 290 and raising of the cantilever assembly 202 and attached upper heater plate 240, the drawer 265 (and vessel 260 placed therein) is free to be extended forward from the remainder of the instrument on roller-bearing slides. The advance and retraction of the drawer 265 allows for any appropriate storage bag (here represented by vessel 260) to be introduced into and removed from the instrument.

Further shown is a graphics control circuit board 280 that attaches to the upper shell, which includes a distinct non-transitory computer-readable medium, that can be electronically connected to the touchscreen interface 140 and/or the access port 145. A peripheral circuit board 295 which also includes a distinct non-transitory computer-readable medium, includes a microcontroller that governs the mechanical and electrical power components of the instrument. The thawing unit 200 can further include a power cord and power switch interface module 270, a cooling fan 292, and a wiring link-chain harness 267 (shown as a volume-filling primitive element).

Figure 4:
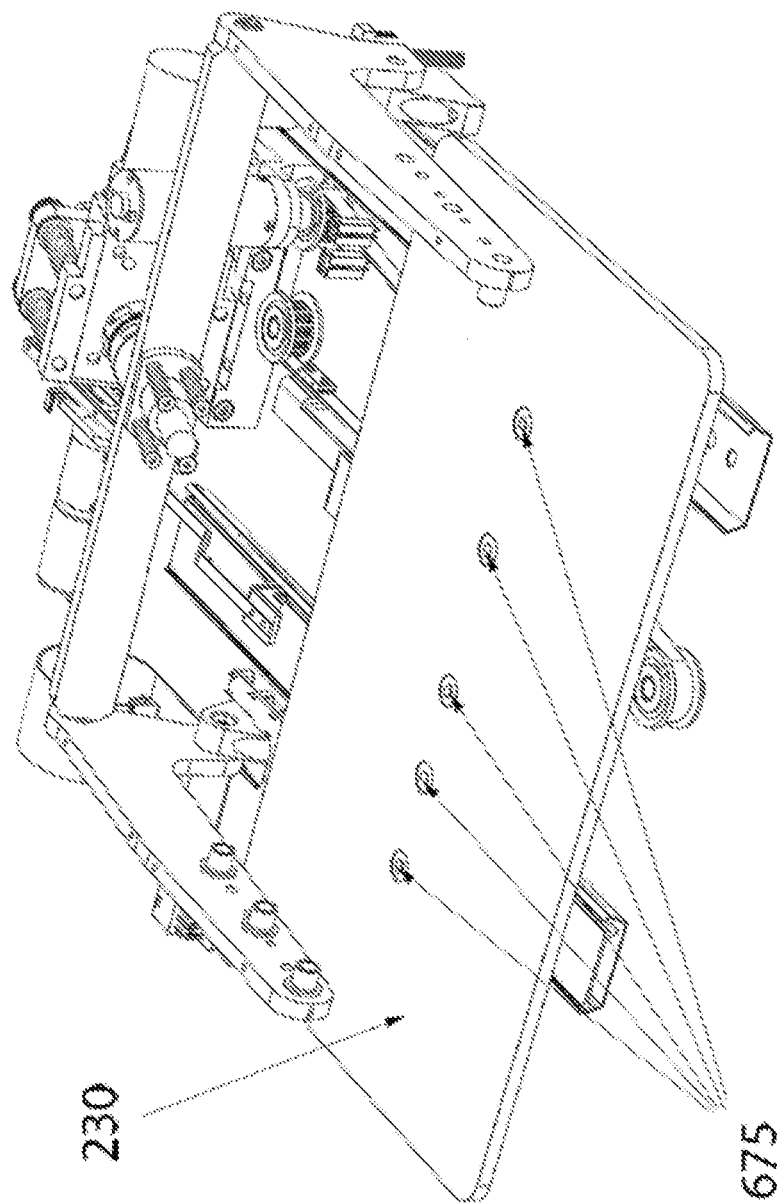
FIG. 4 illustrates an upper front-right view of the apparatus with additional parts of the apparatus selectively removed to focus on temperature sensors in a heater plate according to embodiments of the present invention.

FIG. 4 illustrates internal components of the thawing unit 200, focusing on the temperature sensors built into the structure of the lower heater plate 230. In particular, multiple vessel temperature sensor islands 675 are present in and pass through the body of lower heater plate 230, such that the temperature sensor islands 675 can monitor the surface temperature of cryogenic storage vessels that are resting in or clamped onto the surface of the lower heater plate 230. The multiple temperature sensor islands 675 are distributed along a lateral mid-line of the lower heater plate 230. The spacing between the temperature sensor islands 675 is an arrangement that generally provides for contact of two or more temperature sensor islands 675 with standard cryogenic storage bag vessels that represent the majority of the commercially available bag vessel products. In some aspects, for example with a 25 milliliter storage bag that has a relatively smaller surface area, only one of the temperature sensor islands 675 may be in contact with the storage bag. In some embodiments, two of the temperature sensor islands 675 may be distributed and sized to contact even a 25 milliliter storage bag. The location of the temperature sensor islands 675 within the lower heater plate 230 as opposed to the upper heater plate 240 has an advantage in that, due to gravity, the vessel contents upon reaching a liquid phase will displace any gas pockets that are present in the vessel interior on the bottom side of the vessel and thereby provide the optimal thermal path between the contents and the temperature sensor islands 675. In other words, any bubbles in the cryobag will rise to the top of the bag, and the bottom of the bag will be substantially flat on the surface of the lower heater plate 230, maximizing contact with the available thermal sensors. Another advantage of installing the sensors in the lower heater plate 230 is that the position of the lower heater plate 230 remains static, while sensors installed in the upper heater plate 240 would undergo oscillation during a portion of the thawing process. Of course, in some embodiments, it is appreciated that thermal sensors positioned in the upper heater plate 240 may provide for alternative advantages, such as targeting specific locations for thermal measurements on particular vessels. In further embodiments, the temperature sensors can be thermocouples, thermistors, IR sensors, or RTD sensors.

Further aspects of the overall sample thawing apparatus can include a communications module, formed of a non-transitory computer-readable medium, and configured to transmit to other devices sample data, including thermal data about a sample vessel held by the thawing device. The communications module can be directly coupled with temperature sensors of the sample thawing apparatus, such as temperature sensor islands 675. The communications module can also be electronically coupled with the graphics control circuit board 280, the peripheral circuit board 295, and touchscreen interface 140, allowing for control of all aspects of the instrument. The communications module can be further configured to communicate with a remote microprocessor (e.g. a cloud-based server or computer) in order to sort and display data. The communications module is also configured to receive instruction data or sample vial identification data, and to control the heating of a sample vial accordingly.

Figure 5:
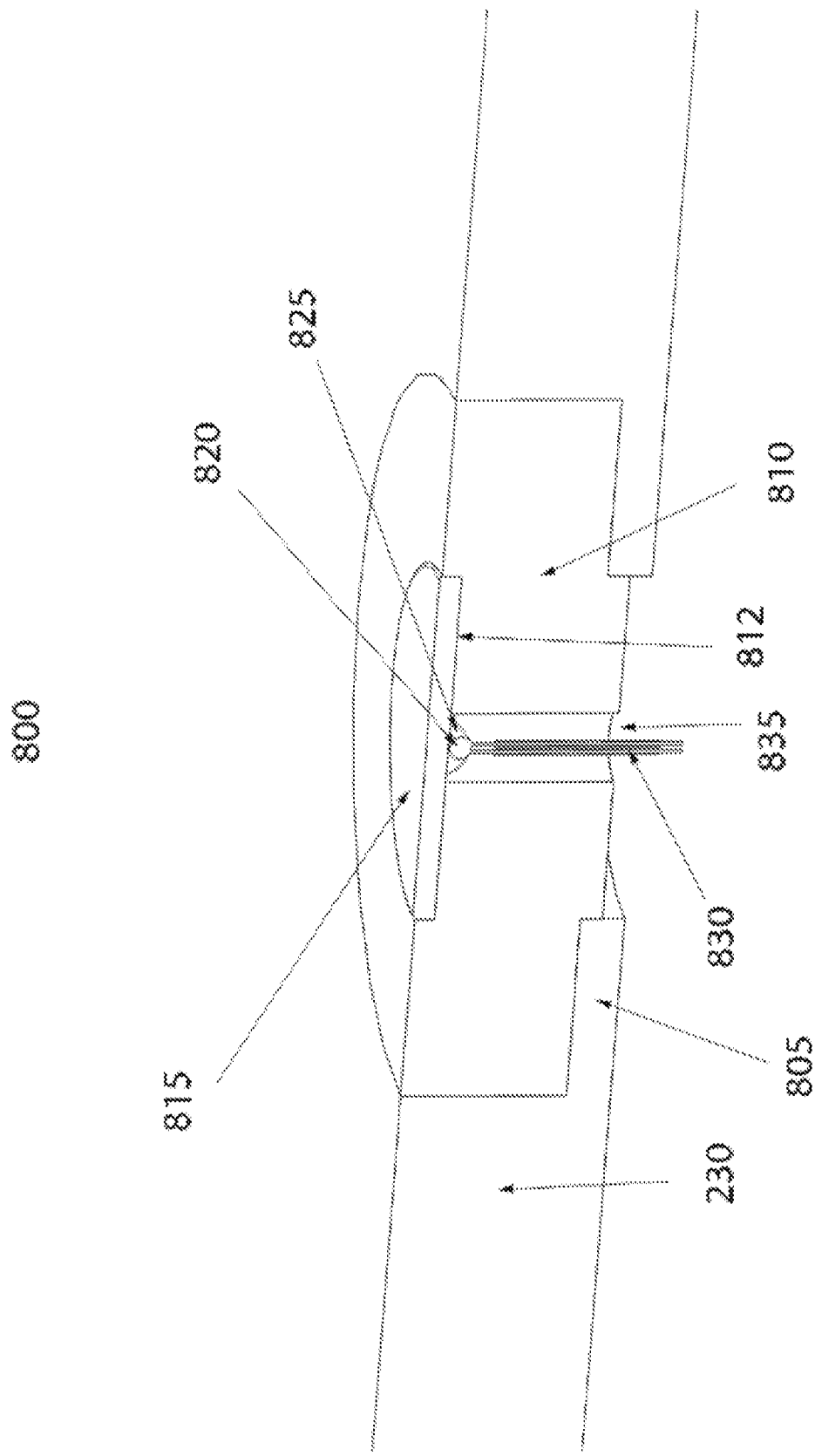
FIG. 5 shows a cross-section view of a thermal sensor according to embodiments of the present invention.

FIG. 5 schematically illustrates a cross-section of a lower heater plate sensor 800 (alternatively referred to as "thermal sensors") showing the sub-components of the sensor islands. Resting in a cylindrical recess in the lower heater plate 230 is an insulation disc 810 that is supported by a ring flange 805, which can be an integrated structure of the lower heater plate 230. In some aspects, the insulation disc can be affixed on a thermally conductive material, which in turn is attached to a thermocouple or other temperature sensor structure. In some embodiments, the insulation disc 810 can be constructed from, but not limited to, a semi-rigid foam material that provides a spring-like resistance to downward forces, and can have a thermal conductivity (K) in the range of from 0.02 to 0.15 W/(m·K). In various embodiments, the semi-rigid foam material can be a polyethylene foam blend, alternative polymer foams, or laminates of foam materials.

The insulation disc 810 includes a recess 812 in the upper surface that receives a contact disc 815 of a thermally conductive material. In some embodiments, the contact disc 815 can be constructed from (but is not restricted to) copper, copper alloys, silver, silver alloys, aluminum or aluminum alloys. In some aspects, the contact disc 815 has a thermal conductivity of greater than one hundred fifty Watts per meter-Kelvin ($\kappa > 150$ W/(m·K)). In some embodiments, the contact disc 815 can be plated with a coating such as nickel or gold to prevent corrosion of the contact disc 815. A thermocouple junction 820 is affixed to the underside of the contact disc 815, generally at the center of the contact disc 815. In some aspects, the thermocouple junction 820 can be attached to the contact disc 815 by a solder joint 825. In some embodiments, a resistance temperature detector can be used instead of a thermocouple junction. Thermocouple wire leads 830 exit the underside of the insulation disc 810 through a channel 835. In some aspects, the contact disc 815 can be bonded to the insulation disc 810 by an adhesive joint.

In operation, a frozen cryobag or sample vessel can be considered a thermal sink load. The thermal sink load, being placed upon the lower heater plate 230, comes into contact with the contact disc 815, thereby creating a dynamic heat flux through the sensor system that includes lower heater plate 230, the insulation disc 810, the contact disc 815, and the cryobag vessel. It should be understood that each of the one or more thermal sensors (e.g., temperature sensor islands 675) in the lower heater plate 230 can form such a sensor system as seen in FIG. 4, which can be controlled individually or in combination based on the aggregate of sensor data measured. The insulation disc 810 can be formed of a material selected to have the lowest thermal conductivity of the sensor system, and therefore under a condition of an established temperature flux between the lower heater plate 230 and the cryobag vessel, the greatest temperature drop in the thermal pathway will occur across the insulation disc 810. As a result the temperature of the contact disc 815 will be closely coupled to the temperature of the cryobag. In other words, the measurement of temperature will be relatively more specific for a section of the cryobag at the respective thermal sensor within lower heater plate 230.

As the temperature of a frozen cryobag vessel that is placed in contact with the lower heater plate 230 will quickly begin to rise, the temperature differential between the lower heater plate 230 and the cryobag vessel will decrease and the magnitude of the thermal flux through each sensor system will be constantly changing, and may have local variations as measured at each thermal sensor in the lower heater plate 230. As a result, the temperature of the contact disc 815 will not necessarily reach equilibrium with the cryobag vessel, but rather the temperature of the contact disc 815 will become a relative proxy for the temperature of the cryobag vessel in the region of the contact bag and contact disc 815 interface. Because the cryobag vessel increases in temperature, and the temperature differential between the lower heater plate 230 and the cryobag vessel is reduced, the temperature of the sensor contact disc 815 will more closely represent that of the cryobag vessel to a point where, at the near completion of the phase change of the cryobag vessel contents, the temperature of the contact disc correlates with temperatures recorded by sensors mounted on the inside wall of the bag with an accuracy of ±10%.

Figure 6:
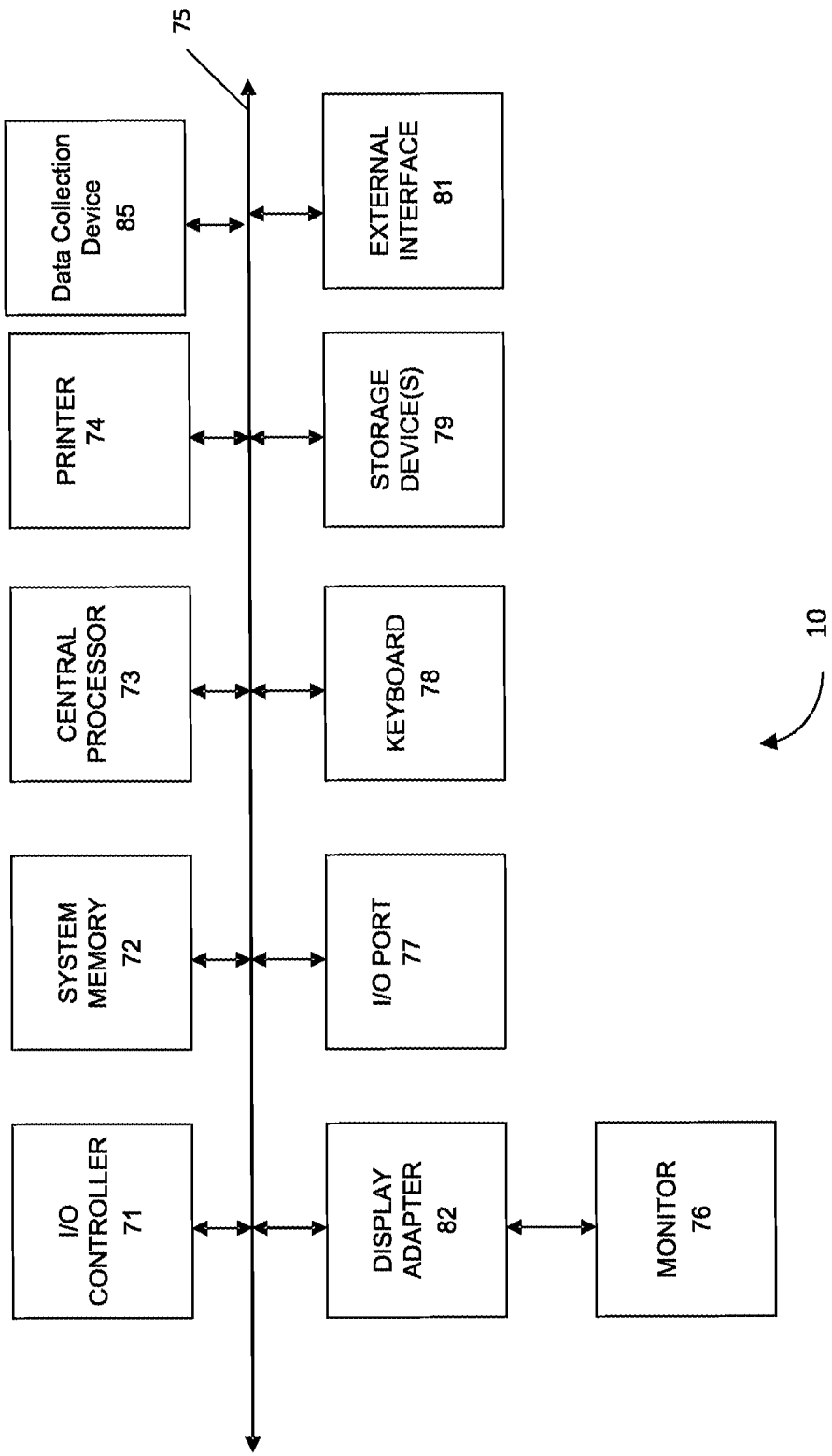
FIG. 6 shows a computer system according to embodiments of the present invention.

Accordingly, the sensor contact disc 815 temperature can be used as an accurate and repeatable metric for the status of the completion of the phase change of the cryobag vessel contents. As such, the interpretation of the temperature profile derived from the sensor contact disc 815 can be used as the primary or exclusive data stream for a completion of thaw algorithm controlling the thawing sequence in the instrument. The application of multiple sensor contacts with the cryobag vessel (as shown in FIG. 6) allows the temperature profile of a cryobag vessel to be measured at different locations on the vessel, and to be integrated into a more complex data processing algorithm that may compensate for temperature gradients within the vessel or within the heater plates, in addition to providing redundant sensors as insurance of functionality in the case of the failure of one of the sensors.

Various uses of the thawing apparatus should be understood from the above figures, including, but not limited to, an exemplary sequence of operations described herein. It should be recognized that described sequence of events to follow represents one of many possible specific event sequences that may be applied to the embodiment of the invention, and is not intended to limit in any way the states, stages, or sequence of events that may be associated with the use of the instrument.

IV. Computer System

Embodiments of the present technology may include a thawing system. The thawing system may include a thawing device, which may be any thawing device described herein. The thawing system may also include a computer system including instruction that when executed control the thawing device to perform a method for thawing.

Any of the computer systems mentioned herein may utilize any suitable number of subsystems. Examples of such subsystems are shown in FIG. 6 in computer system 10. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones, other mobile devices, and cloud-based systems.

The subsystems shown in FIG. 6 are interconnected via a system bus 75. Additional subsystems such as a printer 74, keyboard 78, storage device(s) 79, monitor 76 (e.g., a display screen, such as an LED), which is coupled to display adapter 82, and others are shown. Peripherals and input/output (I/O) devices, which couple to I/O controller 71, can be connected to the computer system by any number of means known in the art such as input/output (I/O) port 77 (e.g., USB). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of a plurality of instructions from system memory 72 or the storage device(s) 79 (e.g., a fixed disk, such as a hard drive, or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g. an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk) or Blu-ray disk, flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the present disclosure has been presented for the purposes of illustration and description. It is not intended to be exhaustive or to limit the disclosure to the precise form described, and many modifications and variations are possible in light of the teaching above.

A recitation of "a", "an", or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Additionally, details of any specific embodiment may not always be present in variations of that embodiment or may be added to other embodiments.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a method" includes a plurality of such methods and reference to "the heater" includes reference to one or more heaters and equivalents thereof known to those skilled in the art, and so forth. The invention has now been described in detail for the purposes of clarity and understanding. However, it will be appreciated that certain changes and modifications may be practice within the scope of the appended claims.

All patents, patent applications, publications, and descriptions mentioned herein are incorporated by reference in their entirety for all purposes. None is admitted to be prior art.

What is claimed is:

1. A method of thawing a frozen sample in a bag-format vessel, the method comprising:
    measuring a plurality of first temperatures of the bag-format vessel in contact with a first surface and a second surface, each first temperature of the plurality of first temperatures measured by a different sensor of a plurality of sensors, each sensor of the plurality of sensors configured to measure temperature at a different location of the bag-format vessel;
    comparing each first temperature of the plurality of first temperatures to a first threshold;
    determining a subset of the plurality of sensors using the comparison, wherein each sensor of the subset of the plurality of sensors measured a first temperature below the first threshold;
    heating the frozen sample using a first heater bank and concurrently heating the frozen sample using a second heater bank;
    measuring a plurality of second temperatures of the bag-format vessel, using the subset of the plurality of sensors;
    upon a second temperature of the plurality of second temperatures exceeding a second threshold, the second threshold indicating that a partially thawed sample is in the bag-format vessel:
        heating the partially thawed sample using the first heater bank, and
        terminating heating of the partially thawed sample using the second heater bank; and
    terminating the heating of the partially thawed sample using the first heater bank after the partially thawed sample has been heated using the first heater bank for a duration.

2. The method of claim 1, wherein when the heating of the partially thawed sample using the first heater bank is terminated, a majority of the partially thawed sample is an aqueous solution and a solid phase remains in the partially thawed sample.

3. The method of claim 2, wherein:
    terminating the heating of the partially thawed sample occurs at a predetermined time, and
    the predetermined time is calculated using an empirically-derived phase change duration.

4. The method of claim 2, further comprising:
    measuring a plurality of third temperatures of the bag-format vessel using the subset of the plurality of sensors,
    wherein terminating the heating of the partially thawed sample using the first heater bank is upon a third temperature of the plurality of third temperatures exceeding a third threshold.

5. The method of claim 4, wherein the third threshold is determined empirically.

6. The method of claim 1, further comprising:
    measuring a plurality of third temperatures of the bag-format vessel using the subset of the plurality of sensors, and
    comparing the plurality of third temperatures to a reference temperature profile,
    wherein terminating the heating of the partially thawed sample using the first heater bank is upon a third temperature of the plurality of third temperatures significantly deviating from the reference temperature profile.

7. The method of claim 1, further comprising:
    disposing the bag-format vessel in contact with the first surface and the second surface, such that:
        a port of the bag-format vessel is proximate to a first end of the first surface and a first end of the second surface; and
        the port of the bag-format vessel is disposed nearer to the first heater bank than the second heater bank.

8. The method of claim 1, further comprising:
    disposing the bag-format vessel such that:
        the bag-format vessel overlaps the first surface at a first portion of the first surface and to not overlap the first surface at a second portion of the first surface; and
        the bag-format vessel overlaps the second surface at a first portion of the second surface and not overlap the second surface at a second portion of the second surface,
    the first heater bank being disposed closer to the first portion of the first surface and the first portion of the second surface than the second portion of the first surface and the second portion of the second surface,
    the second heater bank being disposed closer to the second portion of the first surface and the second portion of the second surface than the first portion of the first surface and the first portion of the first surface,
    the bag-format vessel having a surface area smaller than a surface area of the first surface,
    the bag-format vessel having a surface area smaller than a surface area of the second surface.

9. The method of claim 8, wherein the surface area of the bag-format vessel is 30% or less of the surface area of the first surface.

10. The method of claim 1, further comprising:
    disposing the bag-format vessel such that a line perpendicular to the first surface extends through the second heater bank and does not extend through the bag-format vessel.

11. The method of claim 1, further comprising:
    receiving a user input specifying the size of the bag-format vessel, and
    based on the size of the bag-format vessel, excluding sensors from the subset of the plurality of sensors.

12. The method of claim 11, further comprising:
    receiving a user input specifying the type of media in the bag-format vessel.

13. The method of claim 1, wherein:
    measuring a plurality of first temperatures of the bag-format vessel in contact with a first surface and a second surface includes measuring the plurality of first temperatures at five locations unevenly spaced across the first surface and the second surface.

14. The method of claim 1, wherein the subset of the plurality of sensors comprises fewer sensors than the plurality of sensors.

15. The method of claim 1, wherein:
the frozen sample is a first frozen sample, and
the bag-format vessel is a first bag-format vessel characterized by a first size,
the method further comprising:
thawing a second frozen sample in a second bag-format vessel in contact with the first surface and the second surface, wherein the second bag-format vessel is characterized by a second size different from the first size.

16. The method of claim 1, wherein the first threshold is lower than a temperature of the bag-format vessel measured when the bag-format vessel initially contacts the first surface and the second surface.

17. The method of claim 1, wherein:
heating the frozen sample using the first heater bank comprises targeting a temperature set point in the range of 37° C. to 45° C. for the first heater bank, and
heating the frozen sample using the second heater bank comprises targeting the temperature set point for the second heater bank.

18. The method of claim 1, wherein heating the partially thawed sample using the first heater bank comprises targeting a temperature set point in the range of 37° C. to 45° C. for the first heater bank.

19. The method of claim 1, further comprising:
contacting a bag-format vessel with the first surface,
contacting the bag-format vessel with the second surface, and
clamping the bag-format vessel between the first surface and the second surface.

20. The method of claim 19, further comprising:
loading the bag-format vessel into a drawer of a device, and
removing the bag-format vessel from the device after terminating heating of the partially thawed sample using the first heater bank.

21. A thawing system comprising:
a thawing device comprising:
a first surface,
a second surface,
a plurality of sensors,
a first heater bank, and
a second heater bank; and
a computer system comprising instructions that when executed control the thawing device to perform the method of claim 1.

22. The thawing system of claim 21, wherein the first surface is a first plate, and the second surface is a second plate.

23. The thawing system of claim 21, wherein the plurality of sensors are distributed unevenly across the first surface and the second surface.

24. The thawing system of claim 21, wherein the first heater bank is disposed nearer to a first end of the first surface and a first end of the second surface than the second heater bank is disposed to the first end of the first surface and the first end of the second surface.

25. The thawing system of claim 21, wherein when a bag-format vessel containing a frozen sample is placed between the first surface and the second surface for thawing, a line perpendicular to the first surface extends through the second heater bank and does not extend through the bag-format vessel.

* * * * *